(12) United States Patent
Wright et al.

(10) Patent No.: US 11,155,013 B2
(45) Date of Patent: Oct. 26, 2021

(54) METHOD OF COATING A FIELD JOINT

(71) Applicant: SHAWCOR LTD., Toronto (CA)

(72) Inventors: Adam Wright, Ellon (GB); Ole Thomas Ustad, Orkanger (NO); Magne Skinstad, Orkanger (NO)

(73) Assignee: Shawcor, Ltd., Toronto (CA)

( * ) Notice: Subject to any disclaimer, the term of this patent is extended or adjusted under 35 U.S.C. 154(b) by 958 days.

(21) Appl. No.: 15/518,544

(22) PCT Filed: Oct. 14, 2015

(86) PCT No.: PCT/CA2015/051031
§ 371 (c)(1),
(2) Date: Apr. 12, 2017

(87) PCT Pub. No.: WO2016/058093
PCT Pub. Date: Apr. 21, 2016

(65) Prior Publication Data
US 2017/0232649 A1    Aug. 17, 2017

Related U.S. Application Data

(60) Provisional application No. 62/065,151, filed on Oct. 17, 2014.

(51) Int. Cl.
*B29C 45/14*    (2006.01)
*F16L 58/18*    (2006.01)
(Continued)

(52) U.S. Cl.
CPC .. *B29C 45/14491* (2013.01); *B29C 45/14336* (2013.01); *B29C 45/14614* (2013.01);
(Continued)

(58) Field of Classification Search
None
See application file for complete search history.

(56) References Cited

U.S. PATENT DOCUMENTS 3,711,124 A * 1/1973 Gerholt ................. F16L 59/028
                                                            285/47
4,019,761 A * 4/1977 Heidemann .......... C07D 223/22
                                                            285/47
(Continued)

FOREIGN PATENT DOCUMENTS

WO      2013066169 A1    5/2013
WO      2013066170 A1    5/2013
(Continued)

*Primary Examiner* — Edmund H Lee
(74) *Attorney, Agent, or Firm* — Gregory L. Porter; Hunton Andrews Kurth LLP (57) ABSTRACT

A method of coating a field joint, pipe sections for forming a coated field joint, and a coated field joint formed thereby. First and second angular cut backs are provided in the parent coating of each pipe section. The first angular cut back is at an angle of about 30°±5° relative to the longitudinal axis of the field joint, and the second angular cut back is positioned further from the field joint than the first angular cut back. The first and second angular cut backs result in the parent coating having a stepped profile, a step in the stepped profile between the first and second angular cut backs, the is substantially parallel to the longitudinal axis of the field joint and is free of indentations. The field joint coating is injection moulded to have an upstand that is less than or equal to about 5 mm.

21 Claims, 5 Drawing Sheets

(51) Int. Cl.
*F16L 13/02* (2006.01)
*F16L 58/10* (2006.01)
*B29K 23/00* (2006.01)
*B29L 23/00* (2006.01)

(52) U.S. Cl.
CPC ....... *F16L 13/0272* (2013.01); *F16L 58/1054* (2013.01); *F16L 58/181* (2013.01); *B29K 2023/12* (2013.01); *B29L 2023/22* (2013.01)

(56) References Cited

U.S. PATENT DOCUMENTS

| | | | | |
|---|---|---|---|---|
| 6,264,871 | B1* | 7/2001 | Mullen | ............... F16L 13/0272 |
| | | | | 264/263 |
| 6,843,950 | B1* | 1/2005 | Mally | ............... B29C 45/14598 |
| | | | | 264/276 |
| 8,397,765 | B2* | 3/2013 | Jackson | ................ B32B 15/08 |
| | | | | 138/137 |
| 10,105,885 | B2* | 10/2018 | Wright | ................ B29C 45/1671 |
| 10,107,444 | B2 | 10/2018 | Boyd et al. | |
| 10,946,568 | B2* | 3/2021 | Recher | .................... F16L 58/10 |
| 2009/0159146 | A1* | 6/2009 | Jackson | ............ B29C 45/14336 |
| | | | | 138/146 |
| 2010/0043906 | A1* | 2/2010 | Jackson | .................. B32B 15/08 |
| | | | | 138/149 |
| 2011/0297316 | A1 | 12/2011 | Jackson et al. | |
| 2015/0041017 | A1* | 2/2015 | Hegdal | ................ F16L 58/181 |
| | | | | 138/145 |
| 2017/0066165 | A1* | 3/2017 | Wright | ................ B29C 45/1671 |

FOREIGN PATENT DOCUMENTS

| | | |
|---|---|---|
| WO | 2013070074 A1 | 5/2013 |
| WO | 2013154432 A1 | 10/2013 |
| WO | 2015152726 A1 | 10/2015 |

* cited by examiner

METHOD OF COATING A FIELD JOINT

CROSS-REFERENCE TO RELATED APPLICATION

The application claims the benefit of and priority to U.S. Provisional Patent Application No. 62/065,151 filed on Oct. 17, 2014, under the Title FLUSH FIELD JOINT. The content of the above patent application is hereby expressly incorporated herein by reference into the detailed description hereof.

FIELD

The present disclosure is related to a method of coating a field joint for insulated pipelines, pipe sections for forming such coated field joints, and pipelines having such coated field joints. The present disclosure may be relevant to onshore and/or offshore, oil and gas pipelines.

BACKGROUND

Typically, pipe sections which are factory-coated with an elastomer and/or insulation coating are not fully coated along their entire lengths, but rather are left with uncoated ends to facilitate joining of the pipe section ends (e.g., using a welding process) in the field. Each uncoated end on a pipe section may be about 200 mm in length. The pipe sections are typically welded together as part of the pipe laying process. This welding may take place at the location where the pipe sections are to be reeled, or, such as in the case of sub-sea or offshore pipes, on a lay barge or a reel ship.

After welding, the field joint should be coated. The field joint coating is typically an insulation material that is typically different than, but having similar properties as, the parent coating provided on the pipe section at the factory. For the purpose of speed and ease, the field joint coating is typically applied using an injection moulding process in which the field joint coating is injected into a mould placed about the field joint and overlapping with the parent coating.

Figure 1:
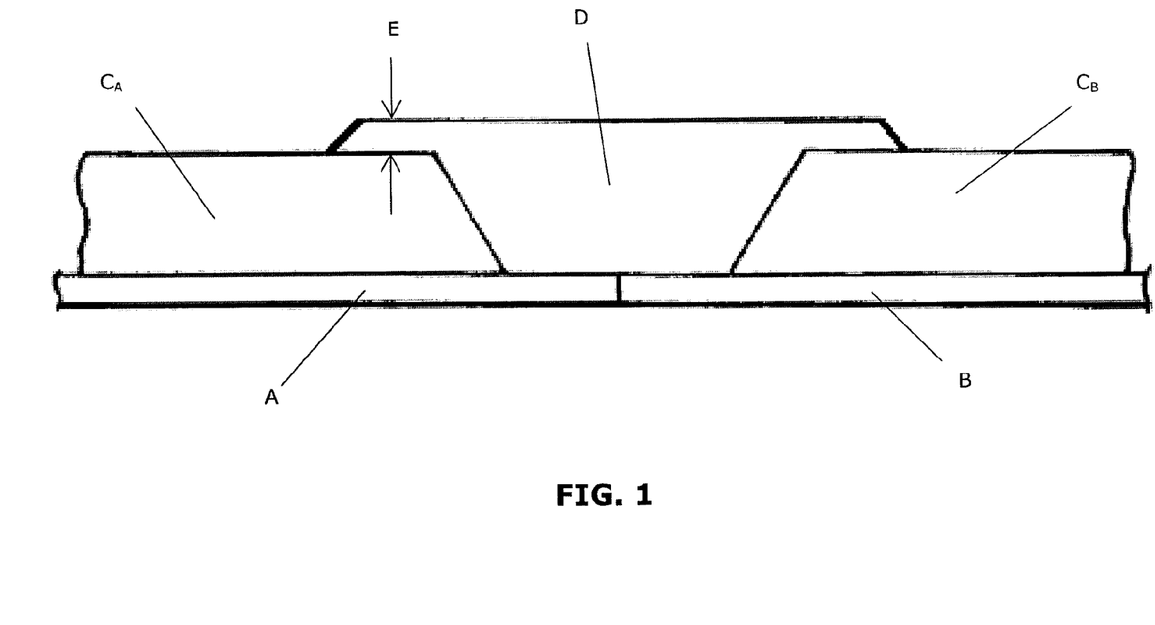
FIG. 1 shows a longitudinal cross-sectional view of a typical conventional coated field joint.

The result is typically a coated field joint as shown in the longitudinal cross-sectional view of FIG. 1. For simplicity, only the upper half of the cross-sectional view is shown, however it should be understood that the bottom half of the cross-sectional view is a mirror of the shown half. This example illustrates a field joint between two pipe sections A and B, each having factory-applied parent coatings $C_A$ and $C_B$, respectively. The field joint coating D typically fills in the gap between the parent coatings $C_A$ and $C_B$, and also overlaps the parent coatings $C_A$ and $C_B$. This overlap means that the field joint coating D has a greater radius than the parent coatings $C_A$ and $C_B$, and this difference is referred to as the upstand E. In a typical coated field joint, the upstand may be 8 mm or greater. The presence of a large upstand (e.g., an upstand that is 8 mm or greater) may cause damage to pipe handling equipment and/or the field joint, such as when the field joint is reeled out over rollers during laying of the pipeline.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In some examples, the present disclosure provides a method of coating a field joint joining uncoated ends of two pipe sections, each pipe section being coated with a parent coating and having at least one uncoated end, the method including: providing a first angular cut back in the parent coating of each pipe section, the first angular cut back being at an angle of about 30°±5° relative to a longitudinal axis of the field joint; providing a second angular cut back in the parent coating of each pipe section, the second angular cut back being positioned further from the field joint than the first angular cut back; the first and second angular cut backs resulting in the parent coating having a stepped profile, a step in the stepped profile being defined between the first and second angular cut backs, the step being substantially parallel to the longitudinal axis of the field joint and being free of indentations; and injection moulding a field joint coating over the uncoated ends and the first and second angular cut backs, the field joint coating being moulded to have an upstand that is less than or equal to about 5 mm.

In some examples, the present disclosure provides a pipe section for forming a field joint, the pipe section including: a pipe section end to be joined with another pipe section end for forming the field joint; and a parent coating over an outer surface of the pipe section, the outer surface in the vicinity of the pipe section end being free of the parent coating; the parent coating in the vicinity of the pipe section end having provided therein first and second angular cut backs, the first angular cut back being at an angle of between 20° and 45° with a manufacturing tolerance of +/−5°, for example, about 30°±5°, relative to a longitudinal axis of the pipe section and the second angular cut back being positioned further from the pipe section end than the first angular cut back; the first and second angular cut backs resulting in the parent coating having a stepped profile, a step in the stepped profile being defined between the first and second angular cut backs, the step being substantially parallel to the longitudinal axis of the pipe section and being free of indentations.

In some examples, the present disclosure provides a coated field joint joining ends of two pipe sections, the coated field joint including: a field joint joining the ends of the two pipe sections, each of the two pipe sections being as described above; and a field joint coating over the field joint and the first and second angular cut backs, the field joint coating forming an upstand that is less than or equal to about 5 mm.

The present disclosure provides methods for coating a field joint, coated field joints formed thereby and pipe sections for forming such coated field joints. The coated field joint in accordance with the present disclosure may achieve an upstand that is substantially flush with the parent coating on the pipe section, or that is minimal (e.g., 5 mm or less). The present disclosure may enable a coated field joint that uses a smaller volume of field joint coating material. A field joint that is flush with the parent coating or that has a reduced upstand may enable easier handling in the yard and/or on the vessel prior to laying of the pipe, may help to reduce the risk of damage to laying equipment (e.g., tensioners on reel-lay vessels), and/or may enable more pipe to be reeled (due to the smaller diameter of the disclosure coated field joint, compared to conventional coated field joint).

Figure 2:
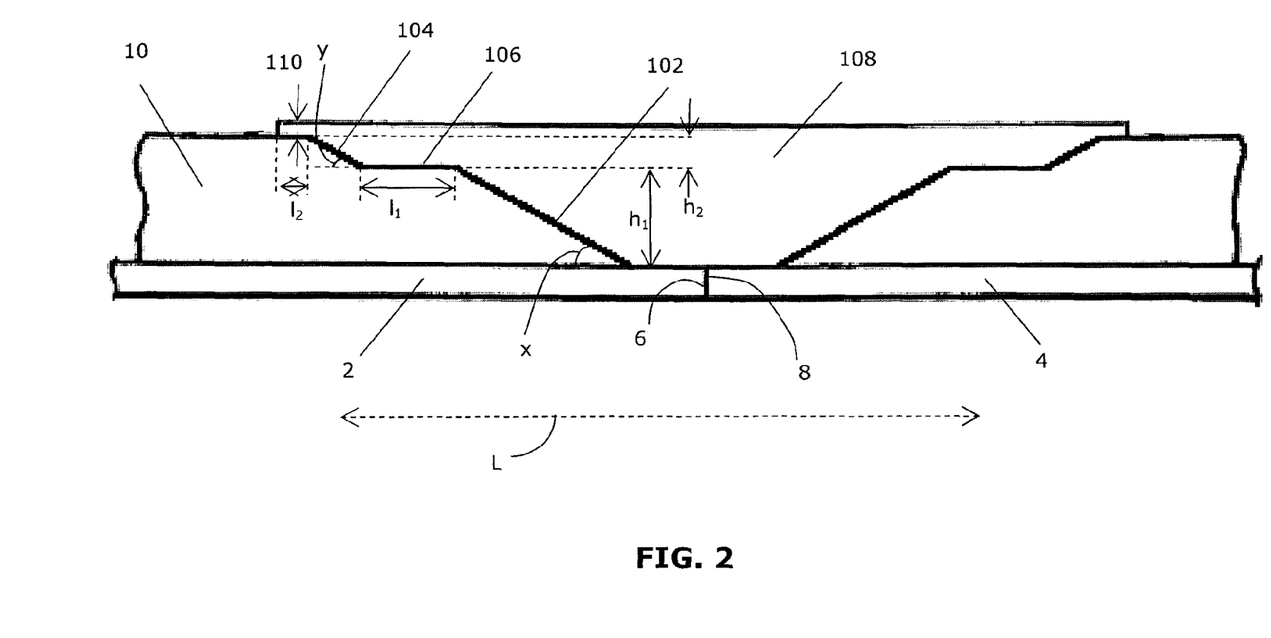
FIG. 2 shows a longitudinal cross-sectional view of an example coated field joint in accordance with an example of the present disclosure.

FIG. 2 shows a cross-sectional view of a coated field joint in accordance with an example of the present disclosure. In this example, two pipe sections 2, 4 are joined together at their respective ends 6, 8. For simplicity, details will be described only for one side of the field joint corresponding to pipe section 2, however it should be understood that the configuration is the same for the other side of the field joint corresponding to pipe section 4.

The pipe section 2 is provided with a parent coating 10, which may have been applied at a manufacturing site, such as a factory. The parent coating 10 may be any thermoplastic or thermosetting material. The parent coating 10 may be a multi-layered coating. For example, the parent coating 10 may include an inner anti-corrosion layer (e.g., a polyurethane or epoxy layer), a middle insulation layer (e.g., a foamed or unfoamed polypropylene layer) and an outer protective layer (e.g., an unfoamed polypropylene, polyurethane, epoxy resin or rubber layer). Different single-layered or multi-layered coatings may be used for the parent coating 10. For simplicity, the parent coating 10 is illustrated without showing different layers. The parent coating 10, as initially applied at the factory, may leave the end 6 of the pipe section 2 uncoated, for example about 200 mm from each end of the pipe section 2 may be free of the parent coating 10. The parent coating 10 may end abruptly or gradually (e.g., taper off) near the ends of the pipe section 2.

Initially, the field joint is formed by joining (e.g., by welding) the uncoated ends 6, 8 of the pipe sections 2, 4. Initially, the pipe sections 2, 4 in the vicinity of the joint are uncoated. The joint may be coated by a field joint coating, as described below. Prior to application of the field joint coating, cut backs may be made in the parent coating 10, as described below.

As shown in FIG. 2, a first angular cut back 102 is provided in the parent coating 10. The first cut back 102 may be made using any suitable technique, such as by a grinding process or a lathing method. The first cut back 102 is provided at an angle x relative to the longitudinal axis L of the field joint (which may also be the longitudinal axis of the pipe sections 2, 4). The first cut back 102 is provided about the entire circumference of the pipe section 2, resulting in a frustoconical shape (see FIG. 3).

A second angular cut back 104 is provided in the parent coating 10. The second cut back may be made using any suitable technique (which may be the same or different from that used for the first cut back 102), such as by a grinding process or a bevelling method. The second cut back 104 is provided further away from the end 6 than the first cut back 102, resulting in a stepped profile, as shown in the cross-sectional view of FIG. 2. The second cut back 104 is provided at an angle y relative to the longitudinal axis L of the field joint. The angle y may be the same as or different from the angle x of the first cut back 102. The second cut back 104 is provided about the entire circumference of the pipe section 2 (see FIG. 3).

While the first cut back 102 is made through the entire thickness of the parent coating 10, the second cut back 104 is made to a depth $h_2$ that is less than the entire thickness of the parent coating 10. In a longitudinal cross-section, as shown in FIG. 2, the first and second cut backs 102, 104 form a stepped profile, with the first cut back 102 forming an incline at an angle x to a height of $h_1$, the second cut back 104 forming an incline at an angle y to a height of $h_2$, and a step 106 of length $l_1$, substantially parallel to the longitudinal axis L, being defined between the first and second cut backs 102, 104. The surface of the step 106 is substantially free of indentations or grooves. Further details about the dimensions of the cut backs 102, 104 are described below.

After the first and second cut backs 102, 104 are provided in the parent coating 10, a field joint coating 108 may be injection moulded over the uncoated ends 6, 8 and the first and second cut backs 102, 104. The field joint coating 108 may be any suitable material, including any thermoplastic or thermosetting material typically known and used for such applications, for example including an insulation material similar to or same as the insulation layer of the parent coating 10 (e.g., a foamed or unfoamed polypropylene material). Other materials may be suitable for the field joint coating 108, including materials suitable for high temperature applications. The field joint coating 108 may extend past the second cut back 104 and cover the parent coating 10 to a distance $l_2$, and may have an upstand 110 of less than or equal to about 5 mm. In some examples, the upstand 110 may be substantially 0 mm (in which case the distance $l_2$ may be substantially 0 mm).

In order to injection mould the field joint coating 108, a mould (not shown) may be positioned about the first and second cut backs 102, 104 on both pipe sections 2, 4 and including the welded field joint. The field joint coating 108 may be injected into the mould. The injection moulding process may be carried out at a sufficient temperature and/or pressure to ensure that the field joint coating 108 fully fills in the mould and fully covers the exposed surfaces of the pipe sections 2, 4, the cut backs 102, 104, and the step 106 (and optionally a portion of the parent coating 10 to a distance $l_2$). The mould may be preheated, for example to about 70° C., which may help with setting and/or curing of the field joint coating 108. The mould may be removed after the field joint coating 108 has set and/or cured. In some examples, the mould may be removed when the field joint coating 108 is partly or mostly set and/or cured, and full setting and/or curing of the field joint coating 108 may occur without the mould.

In some examples, the exposed surfaces of the first and second cut backs 102, 104 and the step 106 (and optionally uncut portions of the parent coating 10 near the second cut back 104 that may be coated by the field joint coating 108) may be pre-treated prior to injection moulding the field joint coating 108. For example, one or more such surfaces may be cleaned (e.g., using a solvent, such as xylene). In some examples, exposed metal surfaces of the pipe sections 2, 4 in the vicinity of the welded field joint may be heated (e.g., using an induction heating coil), such as to a temperature in the range of about 70° C. to about 90° C. A primer, which may improve binding of the field joint coating 108, may be applied to the heated or unheated metal surfaces. In some examples, exposed surfaces of the first and second cut backs 102, 104 and the step 106 (and optionally uncut portions of the parent coating 10 near the second cut back 104 that may be coated by the field joint coating 108) may be abraded (e.g., using a grinder). The surfaces of the first and second cut backs 102, 104 and the step 106 (and optionally uncut portions of the parent coating 10 near the second cut back 104 that may be coated by the field joint coating 108) may be flame treated and may be coated with a primer. The entire area to be coated by the field joint coating 108 may be flame treated and/or primed with a primer. One or more of these pre-treatments may be used in combination. The pre-treatments may help the field joint coating 108 to better bond to the exposed surfaces of the pipe sections 2, 4, the cut backs 102, 104, and the step 106.

In some examples, after the field joint coating 108 has been applied, a quality check may be performed to ensure that the upstand 110 is within acceptable values (e.g., less than or equal to 5 mm).

Figure 3:
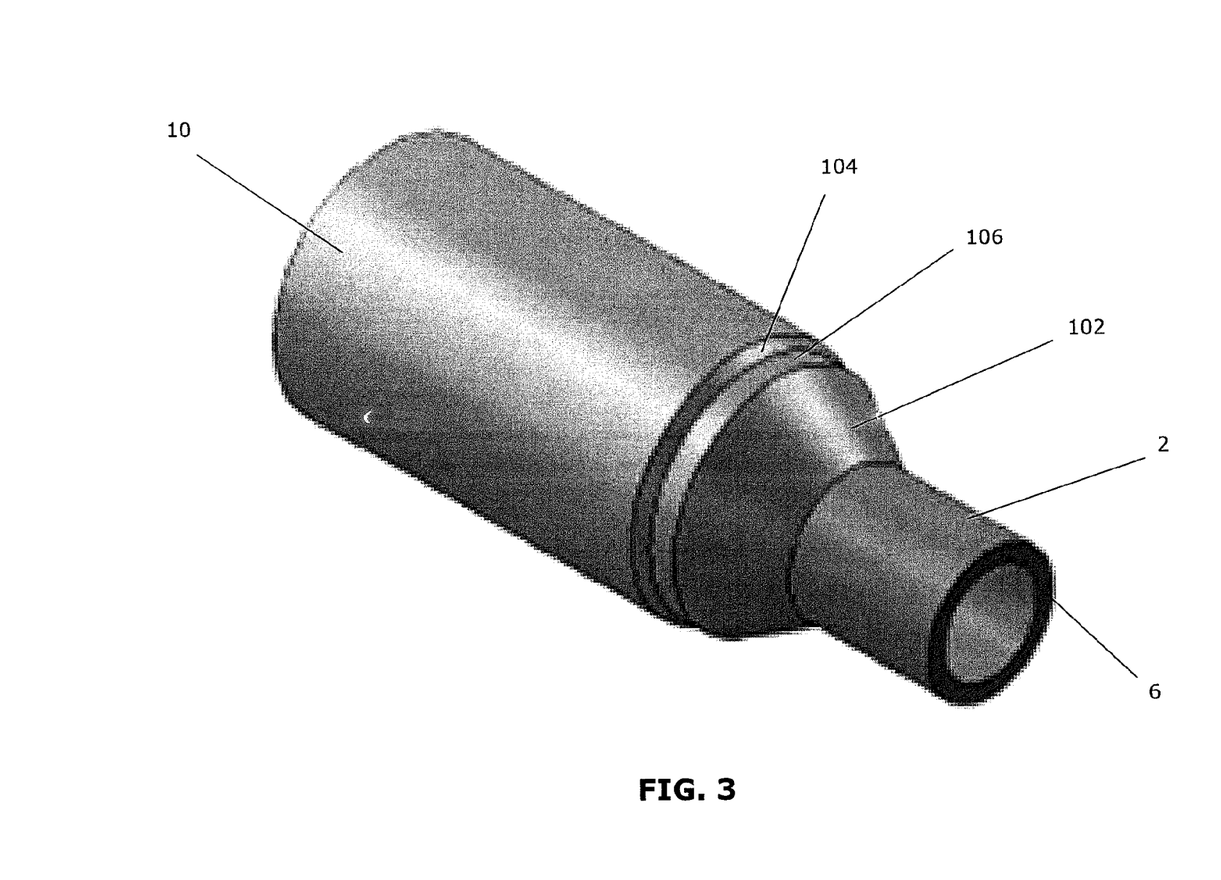
FIG. 3 shows a perspective view of an end of a pipe section after cut backs are provided to the parent coating, in accordance with an example of the present disclosure.
Figure 4:
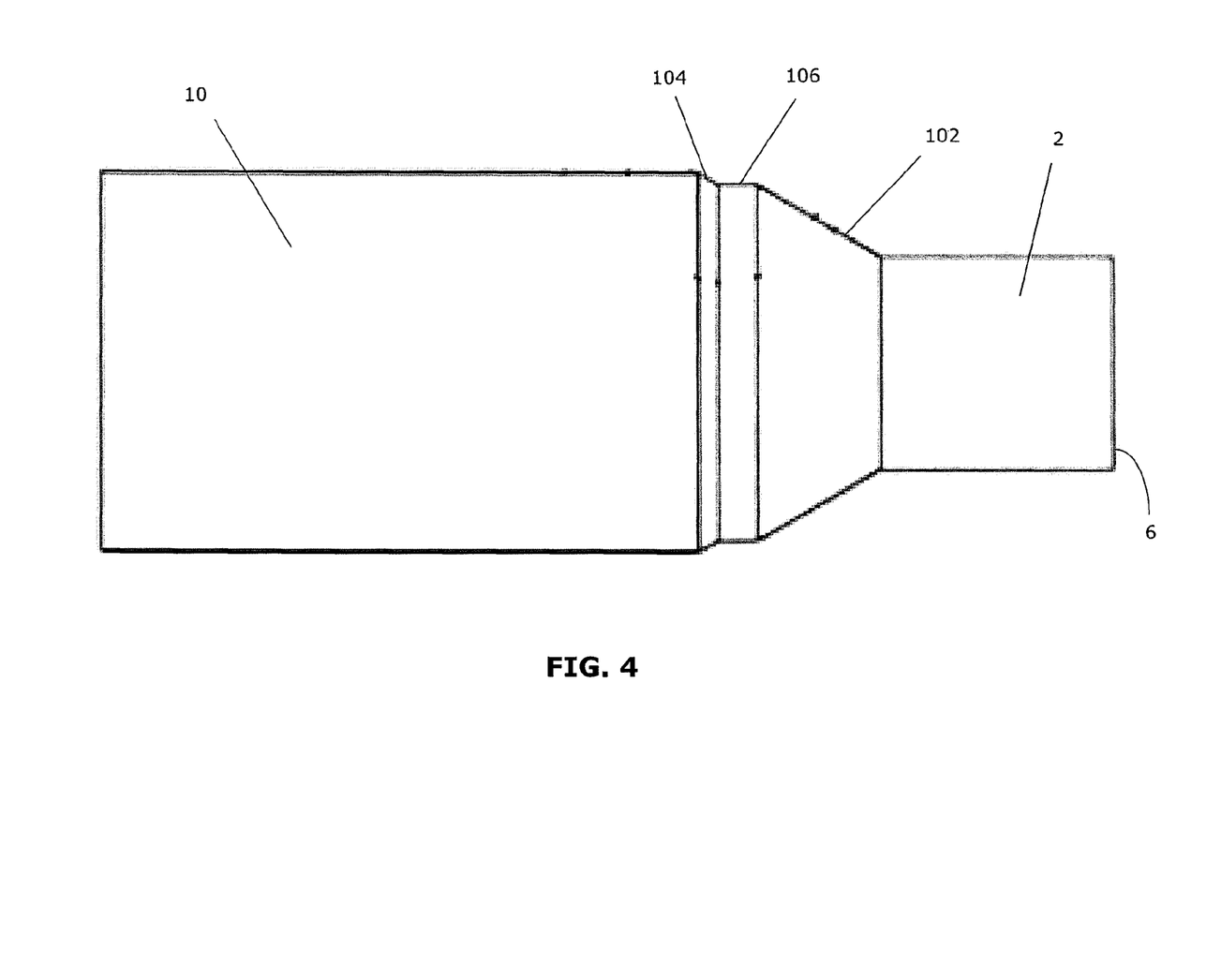
FIG. 4 shows a side view of the pipe section end of FIG. 3.
Figure 5:
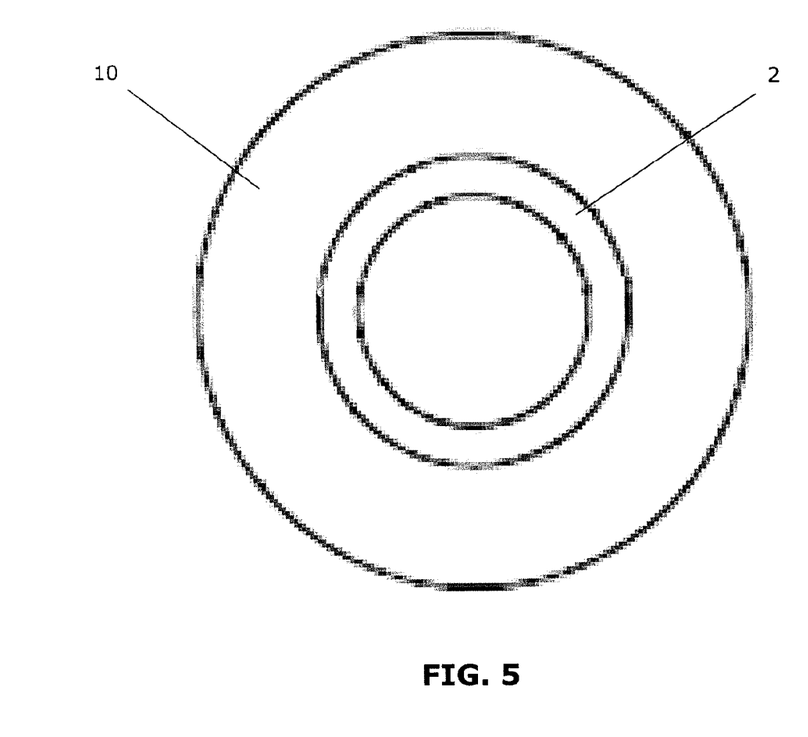
FIG. 5 shows an end-on view of the pipe section end of FIG. 3.

Further details of the cut backs 102, 104 are now described with reference to FIGS. 3-5. For simplicity, these figures illustrate the cut backs 102, 104 for one pipe section 2, prior to injection of the field joint coating 108. For simplicity, the parent coating 10 is shown as a uniform single layer, however it should be understood that the parent coating 10 may be multi-layered.

The first cut back 102 may be provided at an angle x, which is between 20° and 45° with a manufacturing tolerance of +5°/−5° and in certain embodiments may be about 30°±5° relative to the longitudinal axis L. The second cut back 104 may be provided at an angle y, which may, in certain embodiments, also be between 20° and 45° with a manufacturing tolerance of +5°/−5° and in certain embodiments about 30°±5° relative to the longitudinal axis L, or may be different.

The second cut back 104 may be set back from the first cut back 102, such that the step 106, in profile, has a length $I_1$ of up to 50 mm.

In profile, the second cut back 104 can have any height $h_2$ that is greater than or equal to 8 mm. Of course, one can appreciate that the height $h_1$ of the first cut back is equal to the thickness of the parent coating 10, minus $h_2$.

The outer diameter of the pipe is typically between 150 mm and 500 mm.

Referring back to FIG. 2, the field joint coating 108 may extend over the uncut parent coating for a length $I_2$, typically less than 60 mm but desirably about 50 mm or less. As explained above, where the upstand is 0 mm, by definition, $I_2$ would be 0.

In some cases, although reducing the upstand 110 may help to reduce risk of damage to the coated field joint and/or pipe-laying equipment, it may be necessary to have a small amount of upstand 110 (i.e., less than or equal to 5 mm). The presence of a small upstand 110 may be required depending on mould tolerances, application conditions, etc. This small amount of upstand 110 may still be sufficient to avoid or reduce the disadvantages of a large upstand E, as discussed with respect to FIG. 1 above.

Although the cut backs have been described as being provided in the parent coating after the field joint is welded, in some examples the cut backs may be provided in the parent coating before welding the field joint. For example, the cut backs may be provided at a manufacturing site, rather than on site or on the reel-lay vessel. This may be useful to help reduce the time needed for handling and laying the pipeline at the site. Where the cut backs are provided offsite, one or more pre-treating steps, such as those described above, may also be performed offsite (e.g., at the same or a different manufacturing site). In examples where the ends of the pipe sections have been pre-treated offsite, the pre-treated ends may be protected (e.g., wrapped with sheet plastic) to help retain the integrity of the treated field joint area. The protective sheet plastic may expose the pipe section ends, to allow the field joint to be welded, while protecting the pre-treated cut back surfaces. When the welding is complete and the field joint coating is to be moulded, the protective sheet plastic may then be removed, any additional pre-treatment steps may be carried out, and the field joint coating may be injection moulded over the field joint. By providing the cut backs offsite (and optionally one or more pre-treatment steps offsite), the time for processing and laying of the pipeline onsite may be reduced. Further, the amount of equipment needed onsite may be reduced. Performing these steps offsite may also enable more rigorous quality checking and testing.

The present disclosure includes methods for forming the coated field joint, as well as the coated field joint formed thereby. The present disclosure may also include pipe sections in which the first and second cut backs have been made in the parent coating, prior to or after welding of the field joint.

The angles of the cut backs and the length of the step between the first and second cut backs may be designed for better adhesion between the field joint coating and the parent coating, and to help reduce unwanted detachment of the field joint coating from the parent coating, such as when the coated field joint is bent or otherwise handled.

The embodiments of the present disclosure described above are intended to be examples only. The present disclosure may be embodied in other specific forms. Alterations, modifications and variations to the disclosure may be made without departing from the intended scope of the present disclosure. While the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

The invention claimed is:

1. A method of coating a field joint joining uncoated ends of two pipe sections, each pipe section being coated with a parent coating having outer surface and having at least one uncoated end, the method comprising:
   providing a first angular cut back in the parent coating of each pipe section, the first angular cut back being at an angle of between 20° and 45° with a manufacturing tolerance of +5°/−5°, relative to a longitudinal axis of the field joint;
   providing a second angular cut back in the parent coating of each pipe section, the second angular cut back being positioned further from the field joint than the first angular cut back;
   the first and second angular cut backs resulting in the parent coating having a stepped profile, a step in the stepped profile being defined between the first and second angular cut backs, the step being substantially parallel to the longitudinal axis of the field joint and being free of indentations and wherein the step is at least 8 mm from the parent coating outer surface; and
   injection moulding a field joint coating over the uncoated ends and the first and second angular cut backs, the field joint coating being moulded to have an upstand that is less than or equal to about 5 mm.

2. The method of claim 1 wherein the first angular cut back is at an angle of about 30°±5° relative to the longitudinal axis of the field joint.

3. The method of claim 1 wherein the second angular cut back is at an angle of between 20° and 45° with a manufacturing tolerance of +5°/−5°, relative to the longitudinal axis of the field joint.

4. The method of claim 3 wherein the second angular cut back is at an angle of about 30°±5° relative to the longitudinal axis of the field joint.

5. The method of claim 1 wherein the field joint coating is injection moulded polypropylene.

6. The method of claim 1 wherein the upstand is about 0 mm.

7. The method of claim 1 wherein, in the stepped profile, the step between the first and second cut backs has a length of about 50 mm.

8. The method of claim 1 wherein the second cut back is at a depth in the range of about 10 mm to about 15 mm.

9. The method of claim 1 wherein the first and second cut backs are provided in the parent coating by a grinding process or a lathing method.

10. The method of claim 1 further comprising positioning a mould about the first and second cut backs, and injection moulding the field joint coating into the mould.

11. The method of claim 1 further comprising pre-treating exposed surfaces of the field joint prior to injection moulding the field joint coating.

12. A method of coating a field joint joining uncoated ends of two pipe sections, each pipe section being coated with a parent coating and having at least one uncoated end, the method comprising:
   providing a first angular cut back in the parent coating of each pipe section, the first angular cut back being at an angle of between 20° and 45° with a manufacturing tolerance of +5°/−5°, relative to a longitudinal axis of the field joint;
   providing a second angular cut back in the parent coating of each pipe section, the second angular cut back being positioned further from the field joint than the first angular cut back;
   the first and second angular cut backs resulting in the parent coating having a stepped profile, a step in the stepped profile being defined between the first and second angular cut backs, the step being substantially parallel to the longitudinal axis of the field joint and being free of indentations; and
   injection moulding a field joint coating directly over the uncoated ends and the first and second angular cut backs, the field joint coating being moulded to have an upstand that is less than or equal to about 5 mm.

13. The method of claim 12 wherein the first angular cut back is at an angle of about 30°±5° relative to the longitudinal axis of the field joint.

14. The method of claim 12 wherein the second angular cut back is at an angle of between 20° and 45° with a manufacturing tolerance of +5°/−5°, relative to the longitudinal axis of the field joint.

15. The method of claim 14 wherein the second angular cut back is at an angle of about 30°±5° relative to the longitudinal axis of the field joint.

16. The method of claim 12 wherein the field joint coating is injection moulded polypropylene.

17. The method of claim 12 wherein the upstand is about 0 mm.

18. The method of claim 12 wherein, in the stepped profile, the step between the first and second cut backs has a length of about 50 mm.

19. The method of claim 12 wherein the second cut back is at a depth in the range of about 10 mm to about 15 mm.

20. The method of claim 12 wherein the first and second cut backs are provided in the parent coating by a grinding process or a lathing method.

21. The method of claim 12 further comprising pre-treating exposed surfaces of the field joint prior to injection moulding the field joint coating.

* * * * *